United States Patent [19]

Mohnach et al.

[11] 4,126,911

[45] Nov. 28, 1978

[54] UNIVERSAL WIPER REFILL

[75] Inventors: Michael G. Mohnach; William H. Harbison, both of Valparaiso, Ind.

[73] Assignee: The Anderson Company, Gary, Ind.

[21] Appl. No.: 760,120

[22] Filed: Jan. 17, 1977

[51] Int. Cl.$^2$ .............................................. B60S 1/04
[52] U.S. Cl. ............................................... 15/250.42
[58] Field of Search ........................ 15/250.36, 250.42

[56] References Cited

U.S. PATENT DOCUMENTS

| | | | |
|---|---|---|---|
| 2,924,840 | 2/1960 | Anderson | 15/250.42 |
| 3,099,031 | 7/1963 | Ludwig | 15/250.42 |
| 3,140,501 | 7/1964 | MacPherson | 15/250.36 |
| 3,421,175 | 1/1969 | Roberts | 15/250.42 |
| 3,818,536 | 6/1974 | Plisky | 15/250.42 |
| 3,855,664 | 12/1974 | Wubbe | 15/250.42 |
| 3,952,360 | 4/1976 | Plisky et al. | 15/250.42 |
| 4,025,983 | 5/1977 | Schlegel | 15/250.36 |

Primary Examiner—Edward L. Roberts
Attorney, Agent, or Firm—Wegner, Stellman, McCord, Wiles & Wood

[57] ABSTRACT

A wiper blade is comprised of a superstructure for applying pressure to a backing strip which carries a resilient wiping element in contact with a surface to be wiped. The backing strip has projections which engage with the superstructure in such a way that pressure from the superstructure is transmitted through the projections to the backing strip and on through to the wiping element.

5 Claims, 5 Drawing Figures

UNIVERSAL WIPER REFILL

BACKGROUND OF THE INVENTION

1. Field of the Invention

This invention relates to windshield wiper equipment and more particularly to an improved windshield wiper blade having a backing member for receiving and transmitting wiper arm pressure directly from the superstructure to the wiping element.

2. Description of the Prior Art

Traditionally, since the invention of John W. Anderson, U.S. Pat. No. 2,693,063, windshield wiper blades have been constructed with a superstructure operatively connected to a backing strip which, in turn, is operatively connected with a resilient wiping element. Various forms of superstructures have been used, all of which receive pressure from a windshield wiper arm and apply the pressure at two or more points to the backing strip. The pressure from the superstructure to the backing strip is applied through pairs of inwardly facing claws which embrace the outer edges of the backing strip so that pressure from the superstructure is applied through the claws to the edges of the backing strip and from there, on to the resilient wiping element. The claws on the superstructure are designed to move longitudinally with respect to the backing strip so as to permit the backing strip to conform to a surface being wiped.

More recently, the backing strips have been made of plastic which requires special shaping in order to provide the necessary stiffness parallel to the surface being wiped and sufficient flexibility as well as stiffness in a direction transverse to the surface being wiped in order to permit the pressure from the superstructure to be distributed substantially evenly along the length of the blade. The use of plastic for the backing strip generally has taken the form of a tubular portion open on one side substantially throughout its length. Outwardly extending flanges are formed on opposite sides of said tubular portion such that the claws of a superstructure are adapted to slidably engage the outer edge portions thereof. Applying pressure in a traditional way through the claws to the outer flanges of the plastic flexor has, in many instances, been less than completely satisfactory. That is, the plastic does not have sufficient stiffness to accept the pressure from the superstructure and transmit it over a substantial portion of the blade so that substantially equal pressure will be applied to the rubber wiping element. As a result, there is a tendency for blades with plastic flexors or backing strips to leave streaks on the surface being wiped due to the uneven distribution of pressure from the superstructure through the backing strip to the wiping element.

SUMMARY OF THE INVENTION

To overcome the above noted problem, projections are formed on the backing strip which projections are adapted to engage with the inner surface of the ends of the superstructure so that downward pressure on the superstructure will be transmitted through the projections to the backing strip and on to the resilient wiping element. Since the pressure is applied to the projections and thence to the elongate tubular portion of the backing strip, the pressure is distributed by the tubular portion of the backing strip throughout the longitudinal length of the blade so that pressure is applied to the wiping element substantially uniformly throughout the length of the blade. With this construction, virtually no streaking results from an improper distribution of pressure from the superstructure to the blade.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
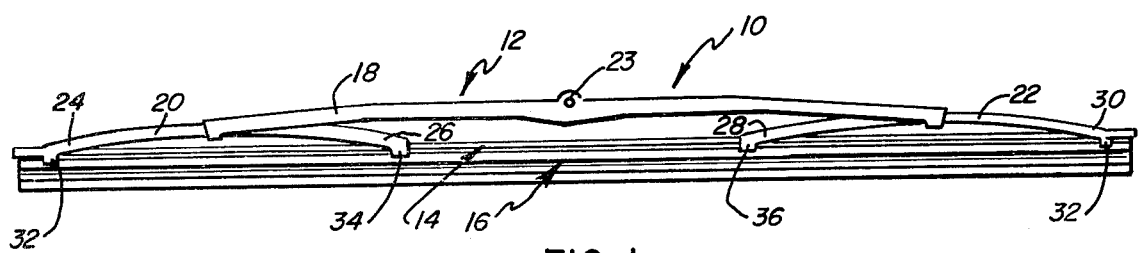
FIG. 1 is a side elevational view of a windshield wiper blade embodying the principles of the present invention.
Figure 2:
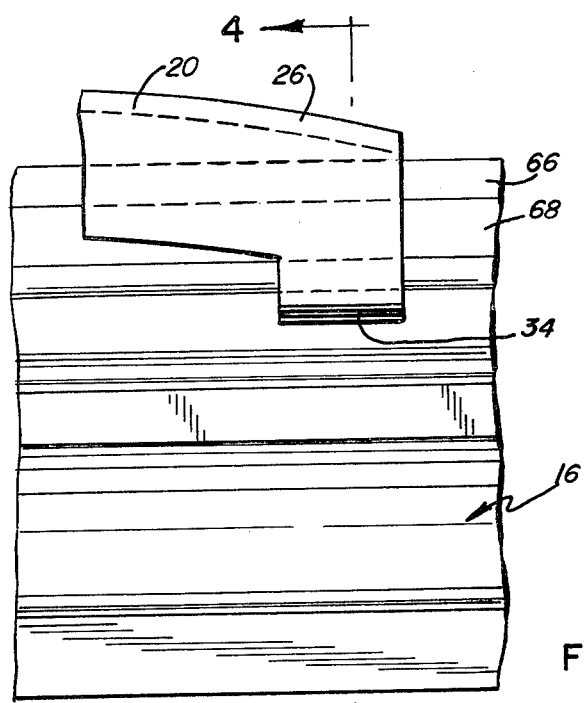
FIG. 2 is a broken away portion of FIG. 1, substantially enlarged and showing one connection between the superstructure and the blade.

Referring to the drawings and, in particular, to FIG. 1, a windshield wiper blade assembly 10 is shown and includes a superstructure 12, a backing strip 14 and a resilient wiping element 16. The superstructure 12, in the illustrated form, is comprised of a primary yoke 18 and a pair of secondary yokes 20 and 22 pivotally connected to the end portions of the primary yoke 18. The primary yoke 18 has provision, near the midportion 23 thereof, for connecting the blade to the end of a pressure-applying windshield wiper arm (not shown). The windshield wiper arm applies pressure to the midportion of the superstructure 12, which superstructure then distributes the pressure through the backing strip 14 to the wiping element 16. As shown, the pressure from the superstructure 12 is applied to the backing strip 14 at four spaced points, which points are in the general vicinity of the opposite end portions 24,26 and 28,30 of the secondary yokes 20 and 22, respectively. As can best be seen in FIGS. 2 and 4, each end 24 and 26 of the secondary yoke 20 and each end 28 and 30 of the secondary yoke 22 has a pair of inturned claws 32,34 and 36,38, respectively, which claws are shaped in such a way as to embrace the outer edge portions 40,42 of the backing strip 14. The respective end portions 24,26 and 28,30 of the secondary yokes 20 and 22, respectively, are arcuately shaped or concavely curved between the claws so as to bridge shaped backing strip 14.

Figure 4:
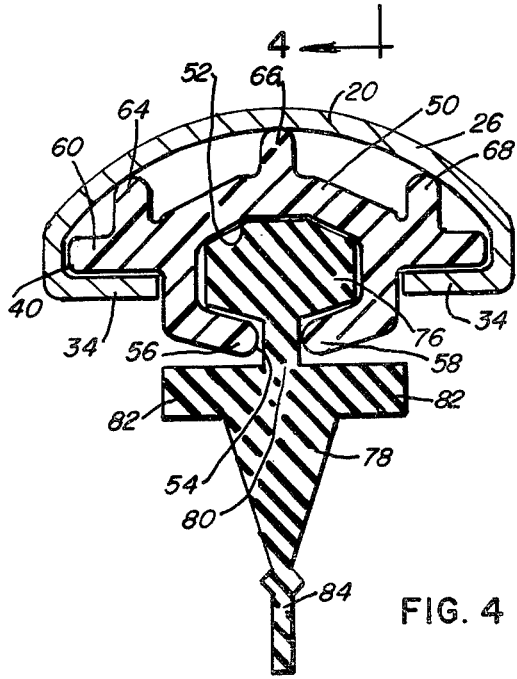
FIG. 4 is a cross-sectional view taken along the line 4—4 of FIG. 2.

The backing strip 14 is preferably made of extruded flexible plastic material and includes a central tubular portion 50 having a cavity or chamber 52, which is open along one side to provide a slot 54 opening into the cavity 52, a pair of overhanging edges 56,58 define the slot 54 and extend continuously from one end of the backing strip 14 to the other. A pair of outwardly or sidewardly extending flanges 60,62 are formed on the tubular portion 50 of the backing strip 14 and have said outwardly facing edge portions 40,42 extending from one end of the backing strip 14 to the other. Parallel projections or ribs 64,66,68 extend lengthwise of the backing strip 14 and protrude upwardly from said backing strip 14 in such a way that the outboard projections or ribs 64 and 68 project upwardly from each flange 60,62 and are located approximately at the junction between the flange and the tubular portion 50. The third or central projection or rib 66 projects upwardly from approximately the longitudinal midportion of the tubular portion 50 throughout the length of the backing strip 14. The projections or ribs 64,66,68 are spaced from each other an equal amount and extend upwardly from the backing strip 14 in such a way that an arc drawn tangent to the three outer edges of the projections or ribs has a radius of curvature substantially equal to the radius of curvature of the inside of the end portions 24,26 and 28,30 of the secondary yokes 20 and 22, respectively. This is best illustrated in FIG. 4 where it will be noted that the outer projecting end portions of the projections 64,66,68 lie along the arc of a curve substantially coinciding with the arc or curvature of the inside surface of the end portions of the secondary yokes 20 and 22. In this way, pressure applied to the secondary yokes 20 and 22 will be transmitted through the projections 64,66,68 to the tubular portion 50 of the backing strip 14 with the lower portions of the claws 32,34 and 36,38 spaced downwardly a short distance from the lower surface of the flanges 60,62. In this embodiment, the pressure from the wiper arm is not transmitted from the secondary yokes 20 and 22 and through the claws 32,34 and 36,38 to the edge portions 40,42 of the backing strip 14, but rather is transmitted through the end portions 24,26 and 28,30 of the secondary yokes 20 and 22, respectively, to the projections 64,66,68 and into the backing strip 14.

The resilient wiping element 16 has an enlarged retaining bead 76 which is joined to an intermediate body portion 78 through a thin or narrowed neck portion 80. The intermediate body portion 78 has sidewardly extending ears 82 and is triangularly-shaped culminating in a wiping lip 84 spaced from the retaining bead 76.

Figure 3:
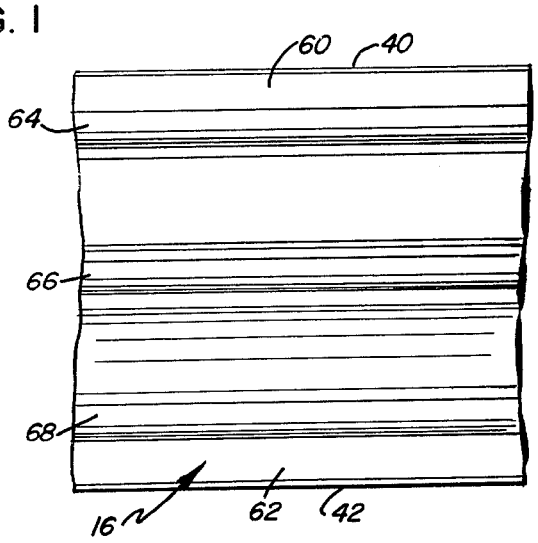
FIG. 3 is a partial top plan view of a section of the backing strip of FIG. 2.

Although, in the illustrated embodiment of FIGS. 3 and 4, three upwardly extending projections or ribs 64,66,68 are shown, it should be understood that at least two, and more than three, projections would function provided they are equally spaced across the width of the backing strip 14.

The improved windshield wiper blade operates by means of arm pressure being applied to the primary yoke 18 and through the primary yoke 18 to the secondary yokes 20 and 22. At the ends of the secondary yokes 20 and 22, the pressure is transmitted through the curved end portions 24,26 and 28,30 of the secondary yokes 20 and 22, respectively, directly to the projections or ribs 64,66,68 on the backing strip 14. The pressure is then distributed longitudinally to the backing strip 14 and to the bead 76 of the wiping element 16. The pressure is then transmitted through the resilient wiping element 16 to hold the wiping lip 84 in contact with the surface being wiped. The pressure will be evenly distributed through the length of the projections or ribs 64,66,68 and thereby is passed through the backing strip 14 to the wiping element 16 in a balanced or relatively even manner. The projections or ribs 64,66,68 not only serve to receive the pressure from the secondary yokes 20 and 22, but also serve as stiffening members for the backing strip 14 so that when the pressure is applied to the projections, the projections will distribute the pressure longitudinally from the receiving point so as to apply the pressure not only directly down through the backing strip 14, but also along the length of the backing strip 14 to thereby better conform the backing strip 14 and the wiping element 16 to the surface being wiped.

Figure 5:
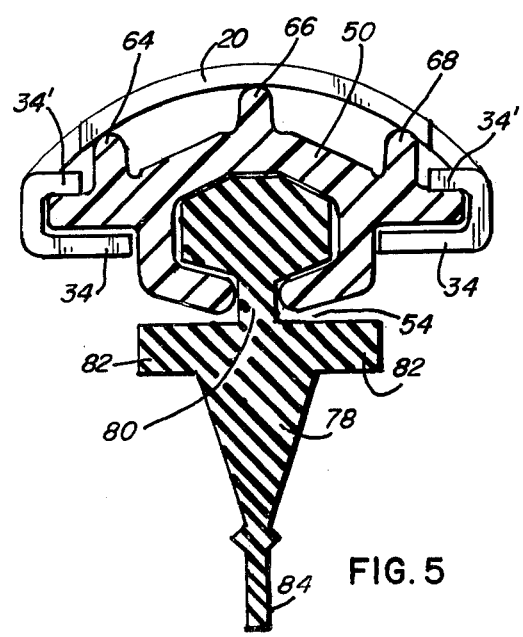
FIG. 5 is a cross-sectional view, similar to the cross-sectional view of FIG. 4, showing a modified form of superstructure connection to the backing strip.

A modified form of the invention is shown in FIG. 5, which is substantially the same as the embodiment shown in FIG. 4 with the exception that the ends of the inboard claws 34',36' of the secondary yokes 20 and 22 are struck inwardly in a manner shown and described in detail in U.S. Pat. No. 3,818,536 owned by the common assignee of the present invention. The claws 34',36' have inturned overlapping edges 90 which bear on the upper surface of the flanges 60,62 of the backing strip 14 so that pressure will be applied to the backing strip 14 not only through the projections 64,66,68, but also through the edges 90 of the claws 34',36' to the edge portions 40,42 of the backing strip 14. The outboard ends of the secondary yokes 20 and 22 do not have the inturned edges 90 and, accordingly, at the outboard ends of the blade, all of the pressure is applied to the backing strip 14 through the projections or ribs 64,66,68 on the backing strip. The claws 34',36' on the inboard ends of the backing strip 14 encircle or embrace the edge portions 40,42 of the flanges 60,62 of the backing strip 14 so as to afford a better control to the backing strip 14 as the backing strip 14 is moved back and forth across the surface being wiped. In some instances, without the use of the encircling claws 34',36' on the edge portions of the backing strip 14, the midportion of the backing strip 14 may tend to curl or roll over, thereby having a negative affect on the quality of the wipe performed by the wiper blade.

In summary, an improved windshield wiper blade is provided whereby pressure is distributed through the end portions of the superstructure where it joins the backing strip by the pressure being applied directly to elongate, longitudinal projections on the backing strip and through the backing strip to the wiping element 16. In the modified form of the invention, some pressure can also be applied to the outer edge portions of the flanges on the backing strip 14 through claws at the ends of the secondary yoke, but the principal pressure is still applied to the backing strip 14 through projections on the backing strip 14.

We claim:

1. An elongate backing member adapted to be attached to a superstructure for holding a flexible windshield wiping element, comprising:
    (a) a tubular portion having a longitudinal chamber for holding a retention bead on said wiping element,
    (b) said tubular portion having a relatively narrow longitudinal slot opening into the chamber,
    (c) a pair of opposed flanges extending laterally outwardly in opposite directions from said tubular portion,
    (d) three projections formed on said tubular portion, each projection extending upwardly therefrom to engage the inside of the end portions of said superstructure such that pressure on the superstructure will be transmitted from said superstructure to said projections and through said tubular portion to said wiping element, and
    (e) a tangent to the outer ends of said projections subscribes an arcuate path in a plane perpendicular to the longitudinal axis of said backing strip.

2. A windshield wiper blade having a backing strip,
    (a) a superstructure operatively connected to said backing strip,
    (b) a resilient wiping element, (c) said backing strip having a portion for holding a retention bead on said wiping element, (d) a pair of opposed flanges extending laterally outwardly in opposite directions from said portion of said backing strip, (e) means formed on said backing strip and extending upwardly therefrom to engage the inside of said superstructure such that pressure on the superstructure will be transmitted from said superstructure to said means and through said backing strip to said wiping element, and (f) said means comprises three projections formed on said tubular receiver, said projections extending upwardly from said backing strip an equal amount and being equally spaced apart and wherein said projections have ends which lie in a path in a plane perpendicular to the longitudinal axis of the backing strip, said path substantially coinciding with the shape of the inside of the superstructure.

3. A windshield wiper blade as claimed in claim 2 wherein the operative connection between said backing strip and said superstructure is at least two pairs of inwardly facing claws formed on said superstructure which embrace the edge portions of said backing strip.

4. A windshield wiper blade as claimed in claim 3 wherein said claws have overhanging portions engaging the top surface of the flanges on said backing strip.

5. In an elongate backing member adapted to be attached to a superstructure for holding a flexible windshield wiping element, comprising:

(a) a tubular receiver for holding said wiping element, (b) a pair of opposed flanges extending laterally outwardly in opposite directions from said receiver, and (c) three projections formed on said tubular receiver, said projections extending upwardly from said receiver to engage the inside of said superstructure such that pressure on the superstructure will be transmitted from said superstructure to said three projections and through said tubular receiver to said wiping element, said projections being equally spaced from each other and a tangent to the end portions of said projections subscribes an arcuate path in a plane perpendicular to the longitudinal axis of said backing member.

* * * * *

UNITED STATES PATENT AND TRADEMARK OFFICE
CERTIFICATE OF CORRECTION

PATENT NO. : 4,126,911
DATED : November 28, 1978
INVENTOR(S) : Michael G. Mohnach; William H. Harbison It is certified that error appears in the above-identified patent and that said Letters Patent are hereby corrected as shown below:

Col. 5, line 13, "tubular receiver" should be --backing strip--;

Col. 6, line 9, "receiver" should be --portion--;
line 11, "receiver" should be --tubular portion--;
line 13, "receiver" should be --portion--;
line 15, "receiver" should be --tubular portion--;
line 18, "receiver" should be --portion--.

Signed and Sealed this

Fourth Day of November 1980

[SEAL]

Attest:

SIDNEY A. DIAMOND

Attesting Officer

Commissioner of Patents and Trademarks